United States Patent
Dial et al.

(10) Patent No.: US 10,060,526 B2
(45) Date of Patent: Aug. 28, 2018

(54) TRANSMISSION VALVE BODIES AND METHODS AND KITS FOR MODIFYING TRANSMISSION VALVE BODIES

(71) Applicant: Sonnax Industries, Inc., Bellows Falls, VT (US)

(72) Inventors: James A. Dial, Springfield, MO (US); MacKenzie M. Campbell, Chester, VT (US)

(73) Assignee: Sonnax Transmission Company, Chicago, IL (US)

( * ) Notice: Subject to any disclaimer, the term of this patent is extended or adjusted under 35 U.S.C. 154(b) by 343 days.

(21) Appl. No.: 15/054,211

(22) Filed: Feb. 26, 2016

(65) Prior Publication Data

US 2016/0252178 A1 Sep. 1, 2016

Related U.S. Application Data

(60) Provisional application No. 62/121,117, filed on Feb. 26, 2015.

(51) Int. Cl.
F16H 61/00 (2006.01)
F16H 61/02 (2006.01)

(52) U.S. Cl.
CPC ..... *F16H 61/0276* (2013.01); *F16H 61/0267* (2013.01); *F16H 2061/0062* (2013.01)

(58) Field of Classification Search
CPC ................ F16H 2061/0062; F16H 2061/0065
See application file for complete search history.

(56) References Cited

U.S. PATENT DOCUMENTS

| 3,592,281 A | * | 7/1971 | Utter | B60K 17/10 180/6.48 |
| 4,651,773 A | * | 3/1987 | Takahashi | F16H 61/029 137/315.22 |
| 4,727,774 A | * | 3/1988 | Sumiya | F16H 61/0021 477/143 |

(Continued)

FOREIGN PATENT DOCUMENTS

| GB | 1072651 A | * | 6/1967 | ............. F16H 61/40 |

OTHER PUBLICATIONS

"Gears for the Transmission Rebuilding Industry." 2012 ATRA PowerTrain Expo (Oct. 25-29, 2012).

(Continued)

*Primary Examiner* — Tisha D Lewis
(74) *Attorney, Agent, or Firm* — Downs Rachlin Martin PLLC

(57) ABSTRACT

Aspects of the present disclosure include methods of modifying a transmission valve body to increase a line pressure response in certain hydraulic shift control system configurations. In one example, a Daimler Chrysler 46RE or 47RE transmission valve body may be modified to have a higher and more rapid line pressure increase when the transmission is in fourth gear and when the torque converter clutch (TCC) is engaged. Aspects of the present disclosure also include methods of modifying a transmission valve body to allow TCC engagement in any gear. Aspects of the present disclosure also include replacement valve bodies, as well as kits for modifying a 46RE or 47RE valve body to perform like a 48RE valve body.

21 Claims, 13 Drawing Sheets

(56) References Cited

U.S. PATENT DOCUMENTS

| | | | |
|---|---|---|---|
| 4,768,396 A * | 9/1988 | Takahashi | F16H 53/02 |
| | | | 137/315.39 |
| 6,099,429 A | 8/2000 | Younger | |
| 6,689,007 B2 | 2/2004 | Warnke | |
| 6,712,726 B1 | 3/2004 | Jackson et al. | |
| 2009/0283166 A1 | 11/2009 | Gott | |

OTHER PUBLICATIONS

Dodge Convert Your 46RE / 47RE Transmission to a Level 4 / 5 48RE Transmission. http://www.transmissioncenter.net/dodge.htm (Last viewed on Feb. 2, 2016).

Schroeder, Randall, "48RE Torque Converters: An Update for Longer Life." Gears Aug. 2009, pp. 36-41.

DNJ Components LLC, Innovative Drivetrain Solutions, Product D-CF1. https://web.archive.org/web/20130825151830/http://dnjcomponents.com/index-7.html (Last viewed on Feb. 15, 2016).

DNJ Components LLC, Innovative Drivetrain Solutions, U.S. Appl. No. 61/128,176, Part D-CF1 Chrysler "RE" Governor Solenoid to GM Pressure Control Solenoid Conversion. https://web.archive.org/web/2013082514520/http://dnjcomponents.com/images/productinstructions.pdf (2013).

ProDemand Diagram. 2008 Dodge Pickup 5.9L Eng R3500. http://www2.prodemand.com/Print/Index?content=false&tab=false&term (Last viewed on Mar. 14, 2016).

* cited by examiner

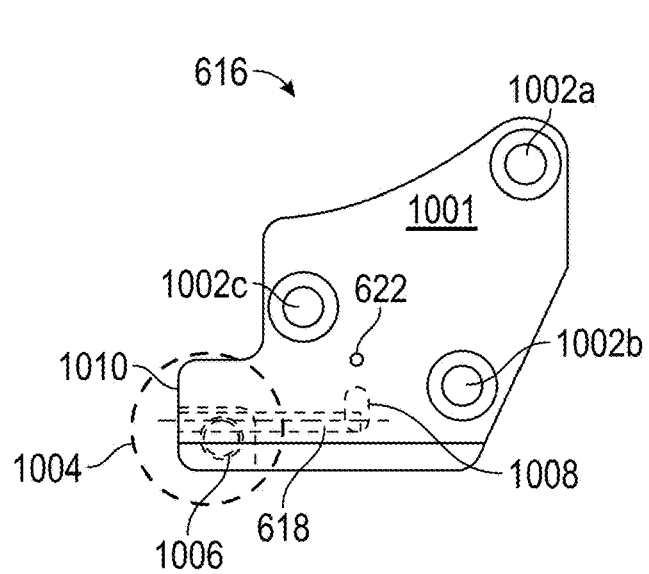
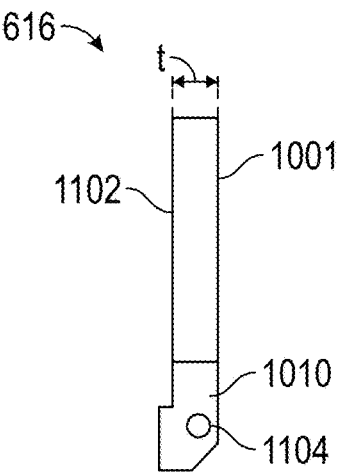
FIG. 10  FIG. 11
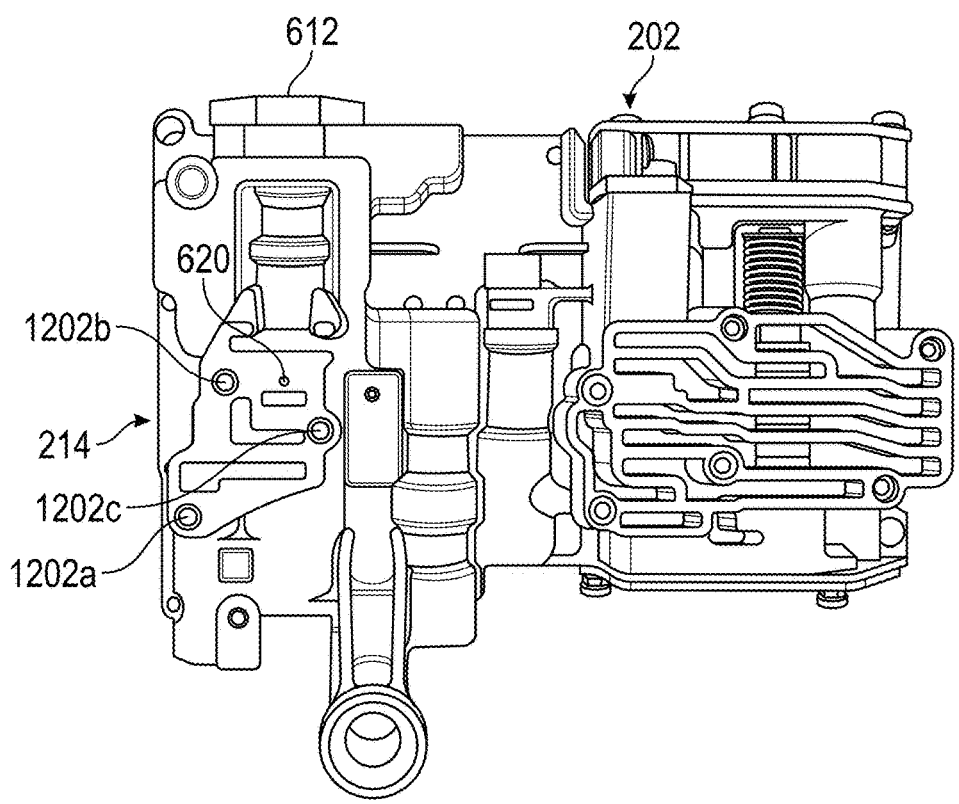
FIG. 12

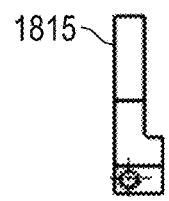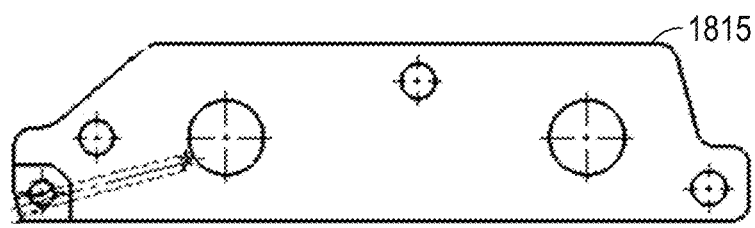
FIG. 19       FIG. 20
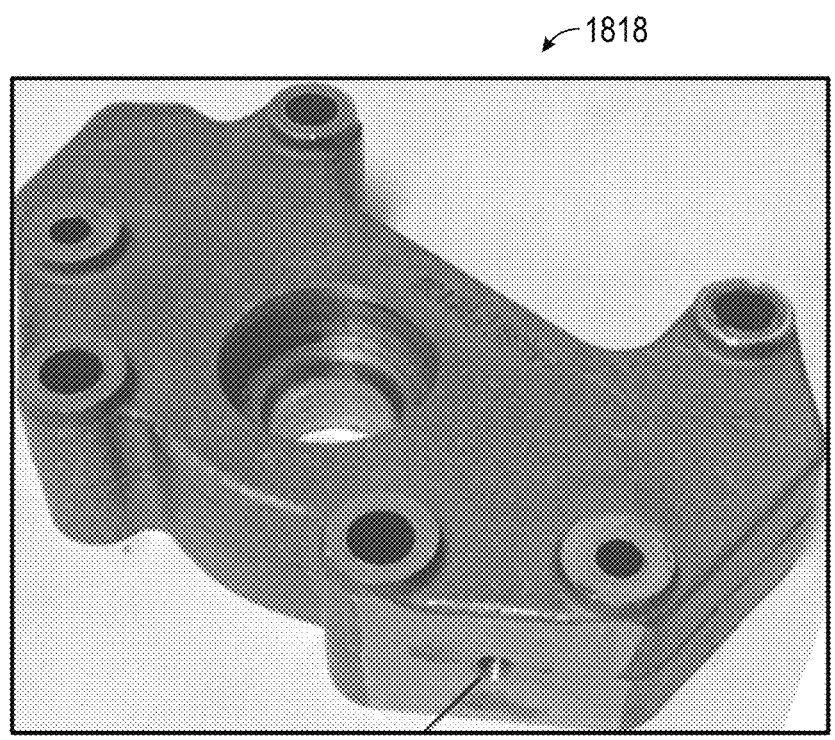
FIG. 21

TRANSMISSION VALVE BODIES AND METHODS AND KITS FOR MODIFYING TRANSMISSION VALVE BODIES

RELATED APPLICATION DATA

This application claims the benefit of priority of U.S. Provisional Patent Application Ser. No. 62/121,117, filed Feb. 26, 2015, and titled Transmission Valve Body Conversion, which is incorporated by reference herein in its entirety.

FIELD OF THE INVENTION

The present invention generally relates to the field of automotive transmissions. In particular, the present invention is directed to transmission valve bodies and methods and kits for modifying transmission valve bodies.

BACKGROUND

The Daimler Chrysler Corporation has produced a number of automatic transmissions, three of which are model numbers 46RE, 47RE and 48RE. Each of the 46RE, 47RE, and 48RE transmissions have four gears (the fourth gear also referred to as overdrive) and are fully automatic transmissions with electronic governors and lock-up-clutch-equipped torque converters. FIG. 13 is a hydraulic circuit diagram of a portion of the 46RE and 47RE hydraulic shift control system 1300. Control system 1300 includes a manual valve 1302 that receives a user input for shifting the transmission into one of the four forward gears, reverse, or park, a pressure regulator valve (PRV) 1304 for controlling main line pressure, a boost valve 1306 for causing the PRV to increase main line pressure under certain conditions, and a lock-up switch valve 1308 for engaging the torque converter lock-up clutch (TCC). Pressurized transmission fluid originating from pump output 1310 is distributed to a series of fluid passageways in the control system 1300, including being distributed to PRV 1304 at cutback ports 1312, 1314, 1316, and 1318, and line pressure port 1319. Prior to entering cutback ports 1312, 1314, 1316, and 1318 the transmission fluid passes through flow restricting orifices 1320, 1322, 1324, and 1326 located in a valve body separator plate (FIG. 5). Pressurized transmission fluid from throttle valve output 1330 acts on PRV 1304 at throttle valve port 1332. PRV 1304 also includes a spring 1333 that, from the vantage point of FIG. 13, urges the PRV to the left.

Boost valve 1306 is in fluid communication with a transmission fluid exhaust reservoir 1334 (denoted by an "X") which is a low-pressure location in hydraulic shift control system 1300. Control system 1300 also includes an exhaust passage 1340 providing fluid communication between cutback port 1318 and boost valve 1306. Boost valve 1306 is disposed in a boost valve bore (not illustrated) in a valve body casting 202 (FIG. 2) and is movable between a first position, where exhaust passage 1340 is not in fluid communication with exhaust reservoir 1334 and a second position (as illustrated in FIG. 13), where the exhaust passage is in fluid communication with the reservoir, thereby causing the fluid pressure at cutback port 1318 to decrease.

During use, the 46RE and 47RE PRV 1304 controls transmission main line pressure via the position of the PRV within the PRV bore (not illustrated). Line pressure increases as PRV 1304 moves to the left, away from spring 1333, and towards an increased line pressure position, and decreases as the PRV moves to the right, towards a reduced line pressure position. Fluid pressure at cutback ports 1312, 1314, 1316, and 1318 urge PRV 1304 to the right, thereby tending to urge the PRV towards a reduced line pressure position and decrease line pressure, and fluid pressure at throttle valve port 1332 and the force of spring 1333 urge PRV 1304 to the left, thereby tending to increase line pressure. The position of PRV 1304 at any given time is a function of the balancing of these forces.

The 46RE and 47RE transmissions are configured to increase main line pressure when the transmission is in fourth gear and when the TCC is engaged. One benefit of increasing line pressure in fourth gear is that higher line pressure increases fluid flow through the transmission cooler, thereby increasing heat removal from the transmission. One benefit of increasing line pressure when the TCC is engaged is to increase the TCC lock-up clutch apply force to help ensure adequate TCC lock-up. Line pressure is increased for both fourth gear and TCC lock-up by exhausting cutback port 1318 to exhaust 1334 via exhaust passage 1340. This is accomplished by causing boost valve 1306 to open, thereby placing exhaust passage 1340 in fluid communication with exhaust 1334. Although cutback port 1312 is in fluid communication with cutback port 1318, the combination of pressurized fluid from pump output 1310 and flow restricting orifice 1320 maintain fluid pressure at cutback port 1312 even when boost valve 1306 is open, such that pressure is only reduced at cutback port 1318 and not at cutback port 1312 when the boost valve opens.

As with the 46RE and 47RE transmissions, the 48RE transmission also increases line pressure in fourth gear and when the TCC is engaged, however, the 48RE includes an alternative design that results in a larger line pressure increase that results in improved transmission cooling in fourth gear due to increased flow through the transmission cooler and improved TCC clutch engagement, which reduces the likelihood of TCC wear from insufficient clamping force. These modifications make the 48RE more desirable, however, 48RE valve bodies are in short supply and more expensive than the 46RE and 47RE transmissions and valve bodies.

SUMMARY OF THE DISCLOSURE

In one implementation, the present disclosure is directed to a method of modifying a transmission valve body. The valve body includes an external surface; a pressure regulator valve (PRV) having a plurality of cutback ports, wherein, during use, pressurized fluid in the plurality of cutback ports urges the PRV towards a reduced line pressure position, a first one of the cutback ports being in fluid communication with an exhaust passage; and a second valve for selectively placing the exhaust passage in fluid communication with a transmission fluid exhaust reservoir. The method includes providing an external fluid passageway having a first end and a second end; placing the first end of the external fluid passageway in fluid communication with a second one of the cutback ports; and placing the second end of the external fluid passageway in fluid communication with the exhaust passage so that, when the valve body is in use, the second one of the cutback ports is exhausted to the exhaust reservoir when the second valve places the exhaust passage in fluid communication with the exhaust reservoir.

In another implementation, the present disclosure is directed to a kit for modifying a transmission valve body, the valve body including a valve body casting having an external surface, a pressure regulator valve (PRV) bore, a plurality of cutback ports extending from the PRV bore, a boost valve bore, and an exhaust passage configured to provide fluid communication between at least one of the cutback ports and the boost valve bore, the boost valve bore for housing a boost valve configured to selectively place the exhaust passage in fluid communication with a transmission fluid exhaust reservoir. The kit includes a fluid conduit having first and second ends, the fluid conduit being sized and configured for the first end of the fluid conduit to be coupled to the valve body casting so as to be in fluid communication with a second one of the cutback ports, the fluid conduit being sized and configured for the second end of the fluid conduit to be coupled to the valve body casting to be in fluid communication with the boost valve bore so that, during use, the second cutback port is placed in fluid communication with the exhaust reservoir when the boost valve places the exhaust passage in fluid communication with the exhaust reservoir.

In yet another implementation, the present disclosure is directed to a valve body that includes a valve body casting having an external surface; a pressure regulator valve (PRV) disposed in a PRV bore formed in the valve body casting; a plurality of cutback ports extending from the PRV bore; a second valve disposed in the valve body casting and configured to be in fluid communication with a transmission fluid exhaust reservoir; an exhaust passage in the valve body casting for providing fluid communication between a first one of the cutback ports and the second valve; and an external fluid conduit disposed outside of the valve body casting for providing fluid communication between a second one of the cutback ports and the exhaust passage; wherein the second valve is configured to selectively place the exhaust passage in fluid communication with the transmission fluid exhaust reservoir to thereby reduce a fluid pressure in the first and second cutback ports and cause the PRV to increase a transmission line pressure.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 10 is a top view of a replacement boost valve cover plate;

FIG. 11 is a side view of the replacement boost valve cover plate of FIG. 10;

FIG. 12 is a top view of a lower valve body casting;

FIG. 19 is a side view of a solenoid manifold plate;

FIG. 20 is a front view of the solenoid manifold plate of FIG. 19;

FIG. 21 shows a modified governor solenoid casting; and

DETAILED DESCRIPTION

Aspects of the present disclosure include methods of modifying a transmission valve body to increase a line pressure response in certain hydraulic shift control system configurations. In one example, a Daimler Chrysler 46RE or 47RE transmission valve body may be modified to have a higher and more rapid line pressure increase when the transmission is in fourth gear and when the torque converter clutch (TCC) is engaged. In one example, the modification results in a 46RE or 47RE valve body that may be used in a 48RE transmission or may be used in a 46RE or 47RE transmission to cause the transmission to perform substantially the same as a 48RE transmission. Aspects of the present disclosure also include methods of modifying a transmission valve body to allow TCC engagement in any gear. Aspects of the present disclosure also include replacement valve bodies, including modified 46RE and 47RE valve bodies designed and configured to perform like 48RE valve bodies, as well as kits for modifying a 46RE or 47RE valve body to perform like a 48RE valve body. Such modifications can have a variety of benefits, including improving the performance of a transmission, reducing the likelihood of excessive TCC wear, enabling TCC engagement in low gears for, e.g., high performance applications, and allowing 46RE and 47RE valve bodies, which are relatively abundant to be used as replacements for 48RE valve bodies, which are relatively scarce.

The present disclosure may use the term "original equipment" or "OE" when referring to particular transmissions and transmission components. As used herein "original equipment" and "OE" refer not only to transmissions and parts originally manufactured by the Daimler Chrysler Corporation, but also to any aftermarket transmissions or parts conforming to the OE dimensions and specifications.

Figure 1:
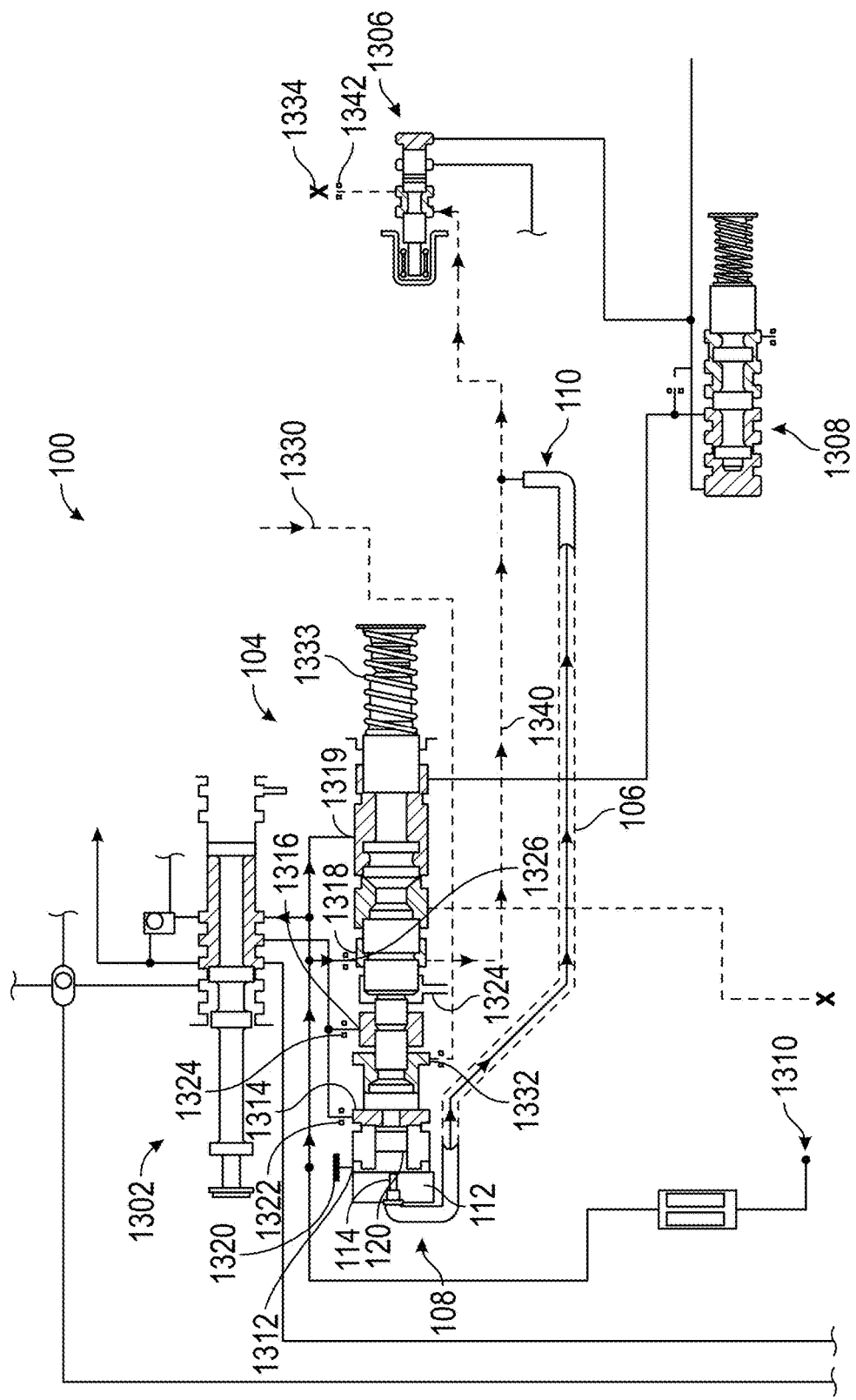
FIG. 1 is a hydraulic circuit diagram of an exemplary modified 46RE or 47RE hydraulic shift control system.

FIG. 1 is a hydraulic circuit diagram of an exemplary 46RE or 47RE hydraulic shift control system 100 that has been modified to have an increased line pressure in fourth gear and when the TCC is engaged. In the illustrated example, many of the components of control system 100 are the same as in control system 1300 and are labeled with the same reference numerals as FIG. 13. A description of those components is not repeated and can be found in the discussion of FIG. 13 above. Unlike control system 1300, exemplary control system 100 includes various modifications that result in PRV 104 having a modified line pressure curve that approximates the line pressure curve of a 48RE transmission. Specifically, exemplary control system 100 includes an external fluid passageway 106 having a first end 108 and a second end 110. First end 108 is in fluid communication with cutback port 1312 and second end 110 is in fluid communication with exhaust passage 1340. During use, cutback port 1312 is exhausted to exhaust reservoir 1334 via external fluid passageway 106 when boost valve 1306 places the exhaust passage in fluid communication with the exhaust reservoir. As described above in connection with FIG. 13, fluid pressure at cutback ports 1312, 1314, 1316, and 1318 urge PRV 104 to the right, thereby tending to urge the PRV towards a reduced line pressure position and decrease line pressure, and fluid pressure at throttle valve port 1332 and the force of spring 1333 urge PRV 104 to the left, thereby tending to increase line pressure. The prior art 46RE and 47RE transmissions (FIG. 13) are configured to increase line pressure when the transmission is in fourth gear and when the TCC is engaged by exhausting fluid pressure at cutback port 1318 to exhaust reservoir 1334 via exhaust passage 1340. Exemplary control system 100, which is a modified version of the 46RE/47RE control system 1300, causes a more rapid line pressure increase and a higher resulting line pressure in fourth gear and when TCC is engaged by also exhausting cutback port 1312 to exhaust reservoir 1334 when boost valve 1306 opens. Cutback port 1312 is exhausted when boost valve 1306 opens due to external fluid passageway 106, which fluidly couples cutback port 1312 to exhaust passage 1340.

In the illustrated example, first end 108 of external fluid passageway 106 is fluidly coupled to cutback port 1312 via replacement PRV endplate 112. Replacement PRV endplate 112 is configured to replace an original equipment (OE) PRV endplate (not illustrated). PRV endplate 112 is designed to be coupled to the valve body casting of a 46RE or 47RE transmission for hydraulically sealing an end of the bore (not illustrated) PRV 1304 (FIG. 13) is disposed in, enabling fluid pressure to act on the outboard face of PRV 104, and physically retaining the PRV, sleeve (not illustrated), and spring 1333 in the PRV bore. PRV endplate 112 includes a fluid port 114 for coupling first end 108 of external fluid passageway 106 to PRV 104 and cutback port 1312. In the illustrated example, second end 110 of external fluid passageway 106 is coupled to exhaust passage 1340 via an opening formed in a 46RE or 47RE valve body, the opening extending from the external surface of the valve body to the exhaust passage. In one example, the opening may be formed by drilling a hole in the valve body casting. Second end 110 may then be inserted into the opening and secured thereto for placing external fluid passageway 106 in fluid communication with exhaust passage 1340. In one example, a hole may be drilled in the valve body casting, the hole having a diameter that is substantially the same as an outer diameter of external fluid passageway 106. For example, external fluid passageway 106 may be a steel tube, having, e.g, an outer diameter in the range of about 1/16" to about 5/16", and in some cases, about 2/16" to about 4/16", and in some cases, about 3/16". In some cases, the steel tube may have a thickness of about 0.028". In other embodiments, external fluid passageway 106 may be rigid and made from a material other than steel. In yet other embodiments, external fluid passageway 106 may be flexible and may include coupling members at one or both of first and second ends 108, 110 for coupling the external fluid passageway to the valve body.

In one example, as shown in FIG. 1, flow restricting orifice 1320 may be eliminated or blocked. In another example, flow restricting orifice 1326 may be blocked rather than orifice 1320. In yet other examples, neither orifice may be blocked. By blocking orifice 1320 or 1326, external fluid passageway 106 may be more effective for reducing fluid pressure at cutback ports 1312 and 1318, which may result in a line pressure response that more closely approximates the line pressure response of the 48RE transmission. In another example, rather than blocking one of orifices 1320 and 1326, a replacement separator plate (not illustrated) may be used that does not include one of orifices 1320 or 1326. In the example, shown, with orifice 1320 eliminated by either blocking it or using a replacement separator plate that does not include an orifice 1320, pressurized fluid from external fluid passageway 106, rather than from cutback port 1312, acts on end 120 of PRV 104, resulting in normal operation of PRV 104 in first through third gears.

In another embodiment (not illustrated) an additional, external valve may be added to control system 100 to act in conjunction with boost valve 1306. An external fluid passageway similar to external fluid passageway 106 may be fluidly coupled to one of cutback ports 1312, 1314, 1316, and 1318, e.g., cutback port 1312, and may also be directly coupled to exhaust reservoir 1334, rather than indirectly coupled to the exhaust reservoir via boost valve 1306. The additional external valve may be configured to controllably place the external fluid passageway in fluid communication with exhaust reservoir 1334 and may be, e.g., activated by boost valve 1306, e.g., activated by a check ball acting under pressure controlled by the boost valve. When stroked, the additional valve would open a path to exhaust reservoir 1334 and exhaust any pressure downstream of the cutback port it was connected to, e.g., cutback port 1312, to the exhaust reservoir.

Figure 2:
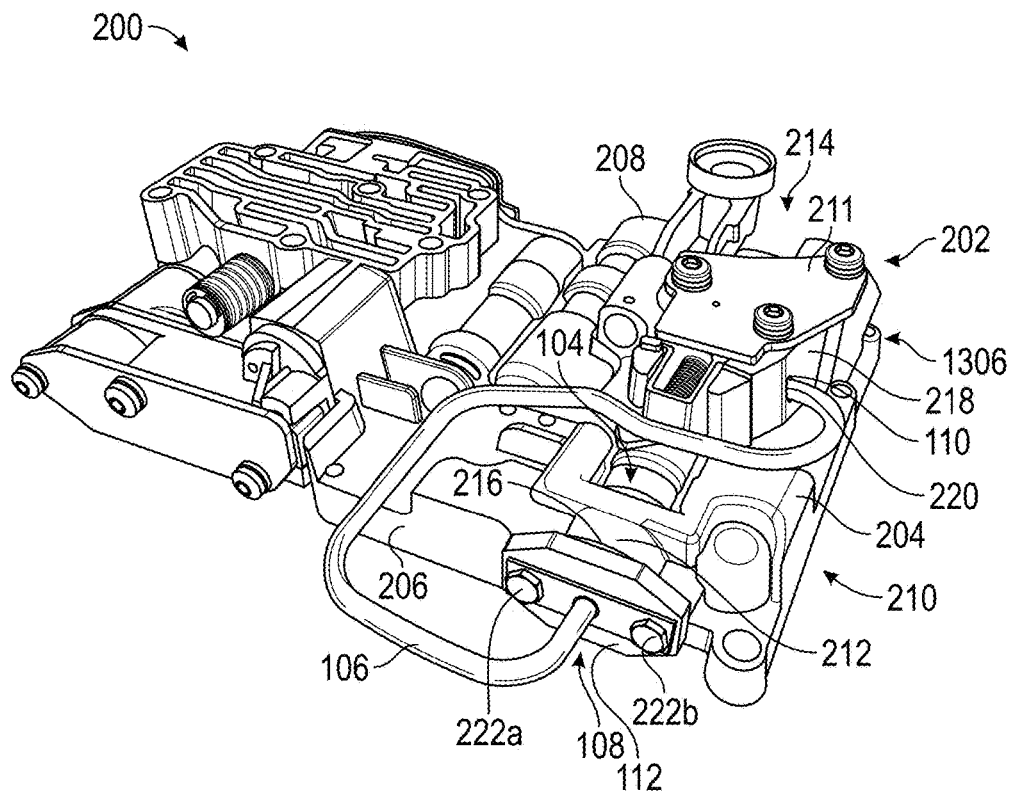
FIG. 2 shows a lower valve body incorporating the hydraulic shift control system of FIG. 1.

FIG. 2 illustrates a lower valve body 200 incorporating hydraulic shift control system 100 (FIG. 1). Exemplary valve body 200 includes a lower valve body casting 202 having an external surface 204, a first end 206, a second end 208 and a bottom surface 210 extending therebetween. Valve body casting 202 includes a PRV portion 212 that defines a PRV bore (not illustrated) that PRV 104 (see also FIG. 1) is slidably disposed within and casting 202 includes a boost valve portion 214 that defines a boost valve bore (not illustrated) that boost valve 1306 (see also FIG. 1) is slidably disposed within. A boost valve cover plate 211 seals boost valve 1306 in the boost valve bore. Thus, in the 46RE and 47RE transmissions, boost valve 1306 (FIG. 1) is located above (as viewed in FIG. 2) PRV 104. The PRV bore (not illustrated) extends substantially parallel to bottom surface 210 and includes a first end 216 proximate valve body casting first end 206. Boost valve portion 214 includes a first outer wall 218 that is substantially parallel to the PRV bore and substantially perpendicular to bottom surface 210. FIG. 2 illustrates an example of external fluid passageway 106 with first end 108 coupled to the PRV bore via replacement PRV endplate 112 and second end 110 coupled to boost valve portion 214 first outer wall 218 via opening 220 formed in external surface 204 of valve body casting 202. Opening 220 extends from external surface 204 to exhaust passage 1340 (FIG. 1) to thereby provide fluid communication between external fluid passageway 106 and exhaust passage 1340. Exemplary replacement PRV endplate 112 is removeably coupled to valve body casting 202 with bolts 222*a* and 222*b*. In the illustrated example, external fluid passageway 106 is a bent steel tube that is positioned close to external surface 204 and permanently coupled to casting 202 to prevent inadvertent contact with other near-by moving transmission components.

Figure 3:
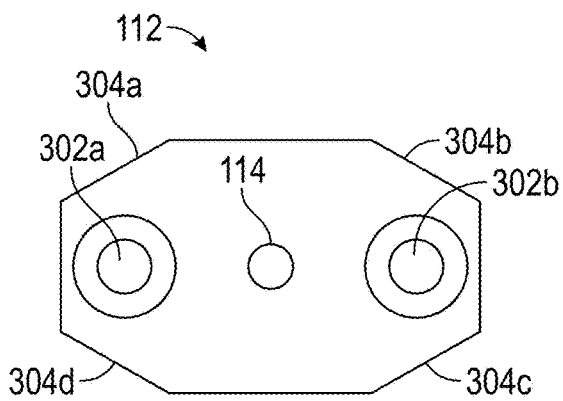
FIG. 3 is a front view of a replacement PRV endplate.
Figure 4:
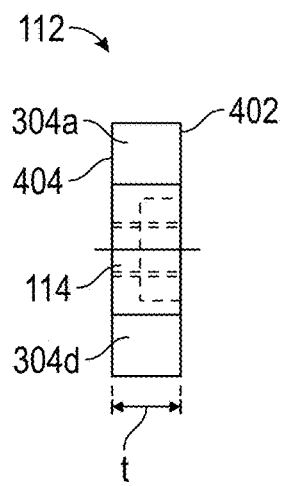
FIG. 4 is a side view of the replacement PRV endplate of FIG. 3.

FIGS. 3 and 4 illustrate replacement PRV endplate 112. As discussed above, endplate 112 is designed to replace an OE PRV endplate and seal an end of the PRV bore that PRV 104 (FIG. 1) is slidably disposed within. PRV endplate 112 is designed to be removeably coupled to valve body casting 202 (FIG. 2) via bolts 222a and 222b (FIG. 2) disposed in bolt holes 302a, 302b. In the illustrated example, holes 302a, 302b are counter-bored and enable the use of the original OE PRV endplate fasteners. As shown in FIGS. 3 and 4, endplate 112 has a substantially uniform thickness t and has an octagonal shape, with chamfered edges 304a-d for providing a compact design. As shown in FIG. 4, fluid port 114 extends through the thickness t of endplate 112 from outer surface 402 to inner surface 404. Thickness t of PRV endplate 112 may be greater than a thickness of the OE PRV endplate that endplate 112 is designed to replace.

Figure 5:
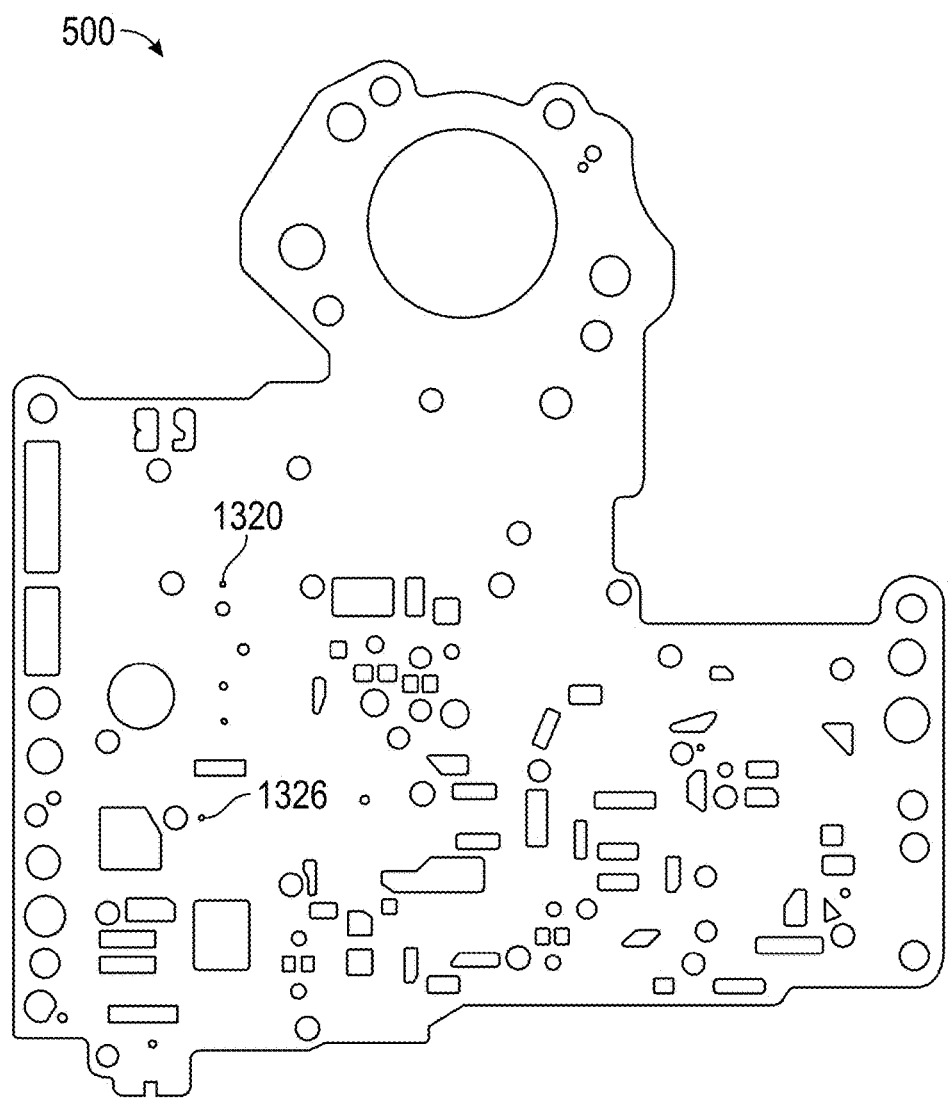
FIG. 5 is a top view of a prior art 46RE or 47RE main separator plate.

FIG. 5 illustrates a prior art 46RE or 47RE main separator plate 500, which, when assembled is attached to bottom surface 210 of valve body casting 202. As noted above, in the example shown in FIG. 1, orifice 1320 (see also FIGS. 1 and 13) may be blocked to more closely match the line pressure response of a 48RE transmission. Thus, in one example, orifice 1320 may be blocked by any means known in the art, such as an aluminum plug (not illustrated) that, in one example, may be supplied in a kit for modifying a 46RE or 47RE valve body. As noted above, in other examples, orifice 1320 may not be blocked, or orifice 1326 may be blocked instead of orifice 1320.

Figure 13:
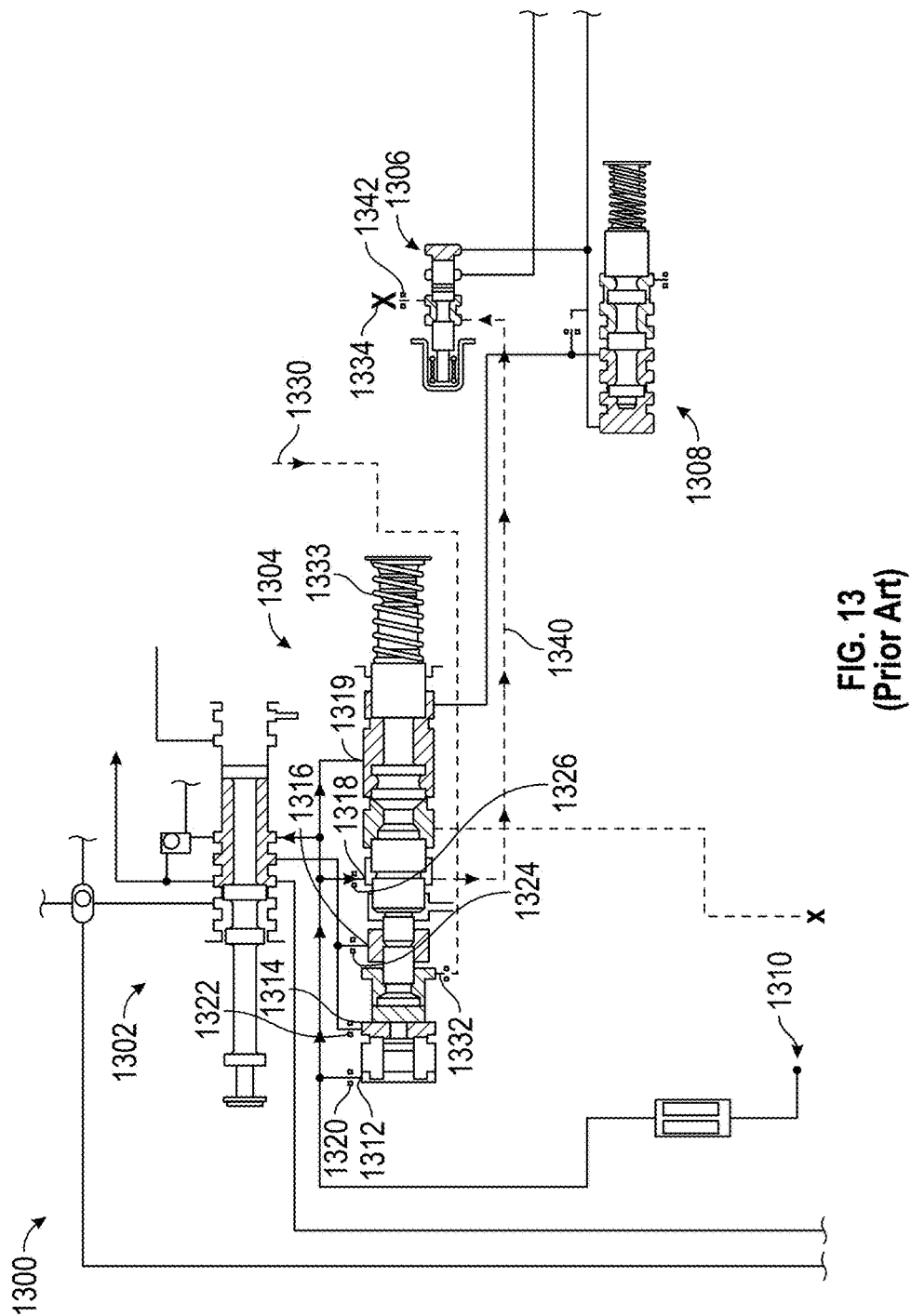
FIG. 13 is a hydraulic circuit diagram of a prior art 46RE or 47RE hydraulic shift control system.

FIGS. 6-12 illustrate an alternative control system 600, which is an alternative modification of a 46RE or 47RE hydraulic shift control system 100. In the illustrated example, many of the components of control system 600 are the same as in control systems 100 and 1300 and are therefore labeled with the same reference numerals as FIGS. 1 and 13. A description of those components is not repeated and can be found in the discussion of FIGS. 1 and 13 above. As with control system 100, control system 600 includes an external fluid passageway 606 for placing cutback port 1312 in fluid communication with exhaust reservoir 1334 to thereby increase line pressure in fourth gear and when the TCC is engaged. Unlike control system 100, second end 610 of external fluid passageway 606 is coupled to boost valve 1306 rather than directly coupled to exhaust passage 1340. Exemplary second end 610 includes a threaded coupling member 614 for coupling the second end of external fluid passageway 606 to boost valve 1306 via a replacement boost valve cover plate 616. Replacement boost valve cover plate 616 is configured to replace OE boost valve cover plate 211 (FIG. 2). Replacement boost valve cover plate 616 seals the hydraulic circuitry in the valve body for fluid entering and leaving boost valve 1306 and secures a sheet-metal retainer that retains the spring-biased boost valve in position in the boost valve bore. Replacement boost valve cover plate 616 includes an internal fluid passageway 618 for placing external fluid passageway 606 in fluid communication with boost valve 1306. In the illustrated example, an opening 620 is formed in the valve body casting to place internal fluid passageway 618 in fluid communication with boost valve 1306 and exhaust reservoir 1334. Exemplary replacement boost valve cover plate 616 also includes an exhaust port 622 including an exhaust orifice 624 for replacing exhaust orifice 1342 (FIGS. 1 and 13). Control system 600 also includes an alternative replacement PRV endplate 612 that includes a fluid port 626 including threaded bore 628 for threadably coupling to threaded coupling member 630 located on first end 608 of external fluid passageway 606. External fluid passageway 606 may be formed from a variety of materials, including a rigid steel tube, or a flexible braided steel fluid conduit. In the illustrated example, none of flow restricting orifices 1320, 1322, 1324, or 1326 are eliminated. In other examples, one of flow restricting orifices 1320, 1322, 1324, or 1326, e.g., orifice 1320 or 1326, may be blocked as in control system 100 (FIG. 1).

Figure 6:
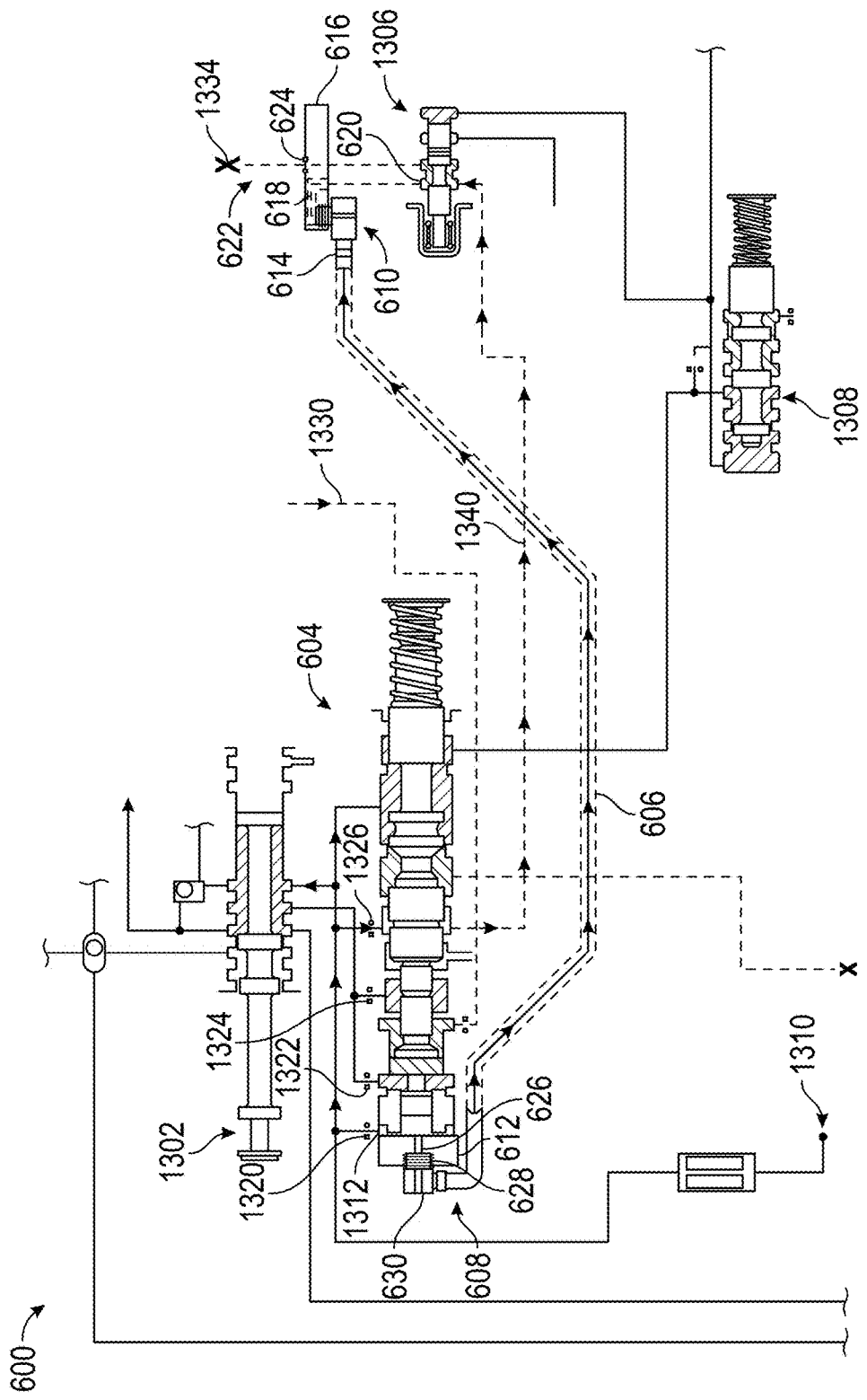
FIG. 6 is a hydraulic circuit diagram of an exemplary modified 46RE or 47RE hydraulic shift control system.
Figure 7:
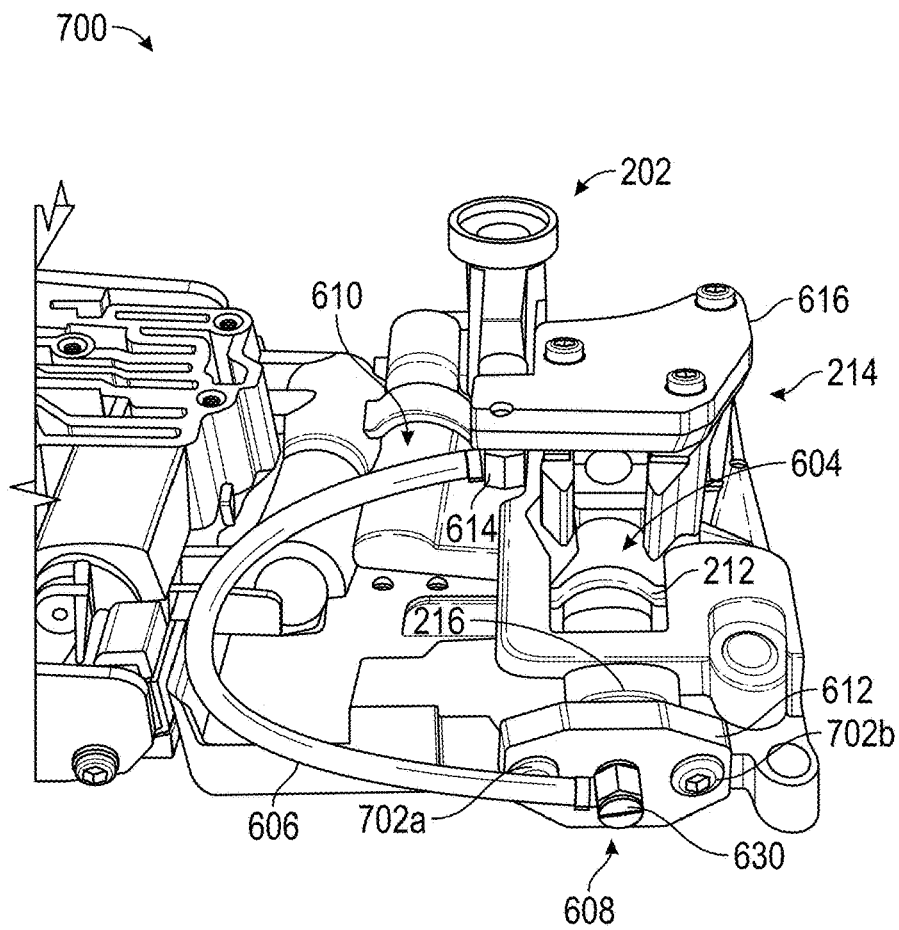
FIG. 7 shows a lower valve body incorporating the hydraulic shift control system of FIG. 6.

FIG. 7 illustrates an example valve body 700 including control system 600 implemented in a 46RE or 47RE lower valve body casting 202. As with valve body 200 (FIG. 2), valve body casting 202 includes PRV portion 212 that defines a PRV bore (not illustrated) that PRV 604 (see also FIG. 6) is slidably disposed within, and casting 202 includes a boost valve portion 214 that defines a boost valve bore (not illustrated) that boost valve 1306 (see also FIG. 1) is slidably disposed within. Exemplary valve body 700 includes replacement PRV end plate 612 for replacing an OE PRV end plate and is removeably coupled to casting 202 with bolts 702a and 702b. As with replacement PRV end plate 112 (FIG. 2), replacement PRV endplate 612 is configured to seal first end 216 of the PRV valve body bore (not illustrated) in PRV portion 212. First end 608 of external fluid passageway 606 is coupled to PRV end plate 612 via threaded coupling member 630. Unlike valve body 200 (FIG. 2) second end 610 of external fluid passageway 606 is coupled to boost valve portion 214 via replacement boost valve cover plate 616. As described above in connection with FIG. 6, replacement boost valve cover plate 616 includes an internal fluid passageway 618 (FIG. 6) for fluidly coupling external fluid passageway 606 to boost valve 1306. In the illustrated example, second end 610 is removeably coupled to replacement boost valve cover plate 616 with threaded coupling member 614. Illustrated external fluid passageway 606 is a flexible conduit. In another embodiment the external passageway may be formed from another material, such as a rigid steel tube, and may be either removeably or permanently coupled to replacement PRV endplate 612 and replacement boost valve cover plate 616.

Figure 8:
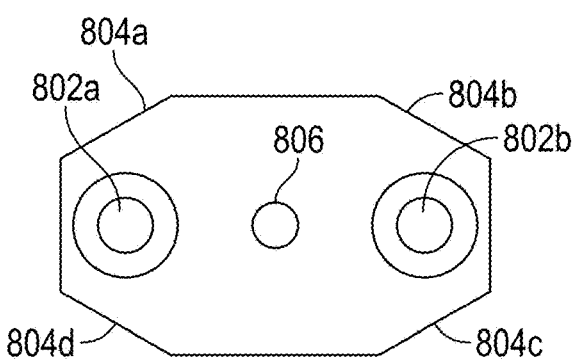
FIG. 8 is a front view of a replacement PRV endplate.
Figure 9:
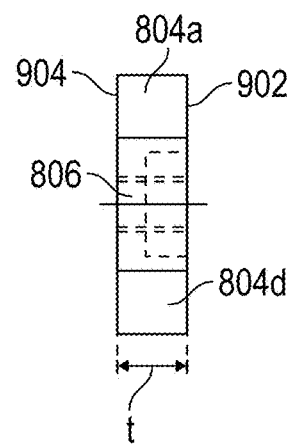
FIG. 9 is a side view of the replacement PRV endplate of FIG. 8.

FIGS. 8 and 9 illustrate replacement PRV endplate 612. As discussed above, endplate 612 is designed to replace an OE PRV endplate and seal an end of the PRV bore that PRV 604 (FIG. 6) is slidably disposed within. PRV endplate 612 is designed to be removeably coupled to valve body casting 202 (FIG. 7) via bolts 702a, 702b (FIG. 7) disposed in bolt holes 802a, 802b. As shown in FIGS. 8 and 9, endplate 612 has a substantially uniform thickness t and has an octagonal shape, with chamfered edges 804a-d for providing a compact design. As shown in FIG. 9, fluid port 806 extends through the thickness t of endplate 612 from outer surface 902 to inner surface 904.

FIGS. 10 and 11 illustrate replacement boost valve cover plate 616 in greater detail, with FIG. 10 being a top view and FIG. 11 being a side view. Exemplary cover plate 616 has a top surface 1001 and bottom surface 1102 (FIG. 11) and includes bolt holes 1002a-c extending from the top to bottom surfaces and configured to align with OE boost cover plate bolt holes 1202a-c (FIG. 12) in valve body casting 202. Illustrated bolt holes 1002a-c are counter-bored to enable the use of the original fasteners. Unlike the 46RE or 47RE OE boost valve cover plate 211 (FIG. 2), replacement cover plate 616 includes a fluid coupling extension 1004 that extends from the replacement cover plate for housing a first end 1006 of internal fluid passageway 618 for coupling second end 610 of the external fluid passageway to bottom surface 1102 (FIG. 11). Replacement cover plate 616 may have an increased thickness t as compared to OE boost valve cover plate 211 (FIG. 2), which it is designed to replace, so as to accommodate internal fluid passageway 618 (shown in broken line in FIG. 10 to indicate it is below top surface 1001). Replacement cover plate 616 includes a pocket cavity 1008 at the end of internal fluid passageway 618 that is configured and dimensioned to be located over opening 620 (FIG. 12) formed in valve body casting 202. In the illustrated example, internal fluid passageway 618 is formed by drilling a hole from end 1010 of plate 616 to cavity 1008 and a plug 1104 (FIG. 11) is used to block the end of the internal fluid passageway so that fluid entering first end 1006 of internal fluid passageway 618 is directed towards the pocket cavity.

Replacement cover plate 616 also includes exhaust port 622, which as described above, may include exhaust orifice 624 (FIG. 6). FIG. 12 shows a top view of valve body casting 202 with replacement boost valve cover plate 616 removed from boost valve portion 214 and showing opening 620 formed in the casting for placing internal fluid passageway 618 of replacement boost valve cover plate 616 (FIGS. 6, 7, 10, 11) in fluid communication with boost valve 1306 (FIG. 6). In one example, opening 620 is formed by removing OE boost valve cover plate 211 (FIG. 2) and drilling a hole in valve body casting 202 above an appropriate location in the boost valve bore such that boost valve 1306 can controllably place internal fluid passageway 618 and external fluid passageway 606 into and out of fluid communication with exhaust reservoir 1334. In one example, opening 620 is located along a centerline of the boost valve bore and is positioned such that when boost valve 1306 is idle, the flow path to exhaust 1334 is blocked by the outboard spool of the boost valve. When boost valve 1306 is stroked the flow path to exhaust 1334 is not impeded.

46RE and 47RE transmissions are designed to hydraulically inhibit actuation of the torque converter lock-up clutch when the transmission is in any gear except third or fourth gear. 48RE transmissions, by contrast, do not inhibit torque converter lock-up clutch actuation hydraulically in any gear. Off road performance enthusiasts can trigger lock-up clutch actuation in 48RE transmissions through a variety of aftermarket electronic devices, e.g., performance "chips" and "programmers." Such a feature offers no advantage for typical highway operation and the manufacturer's transmission control programming does not trigger torque converter clutch lock-up in first gear. Drag racing truck enthusiasts find advantage in actuating the torque converter lock-up clutch in all gears during competition events. Accordingly, in addition to modifying a 46RE or 47RE valve body as described above to have a line pressure response that approximates the 48RE, a 46RE or 47RE can also be modified so that the TCC can be engaged in any forward gear as is possible with the 48RE. The combination of both modifications would enable a modified 46RE or 47RE valve body to be used in place of a 48RE, or would enable the modification of a 46RE or 47RE transmission to perform like a 48RE transmission.

Figure 14:
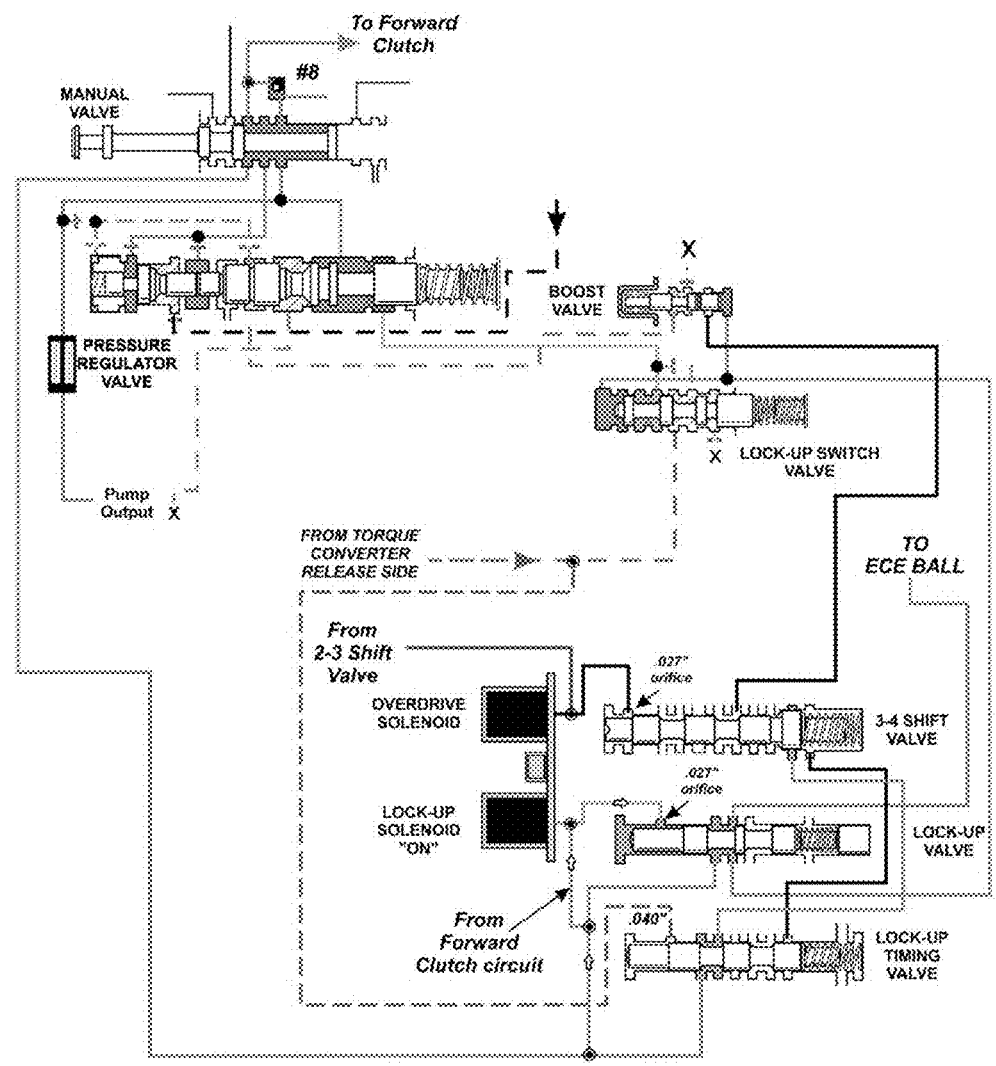
FIG. 14 is a hydraulic circuit diagram of the torque converter lock-up solenoid circuit in the 48RE transmission.

FIG. 14 is a partial hydraulic schematic of the torque converter lock-up solenoid circuit in the 48RE transmission. The forward clutch circuit is connected to the torque converter lock-up solenoid through an orifice. This forward clutch connection allows the torque converter clutch application in first through fourth gear including manual first gear.

Figure 15:
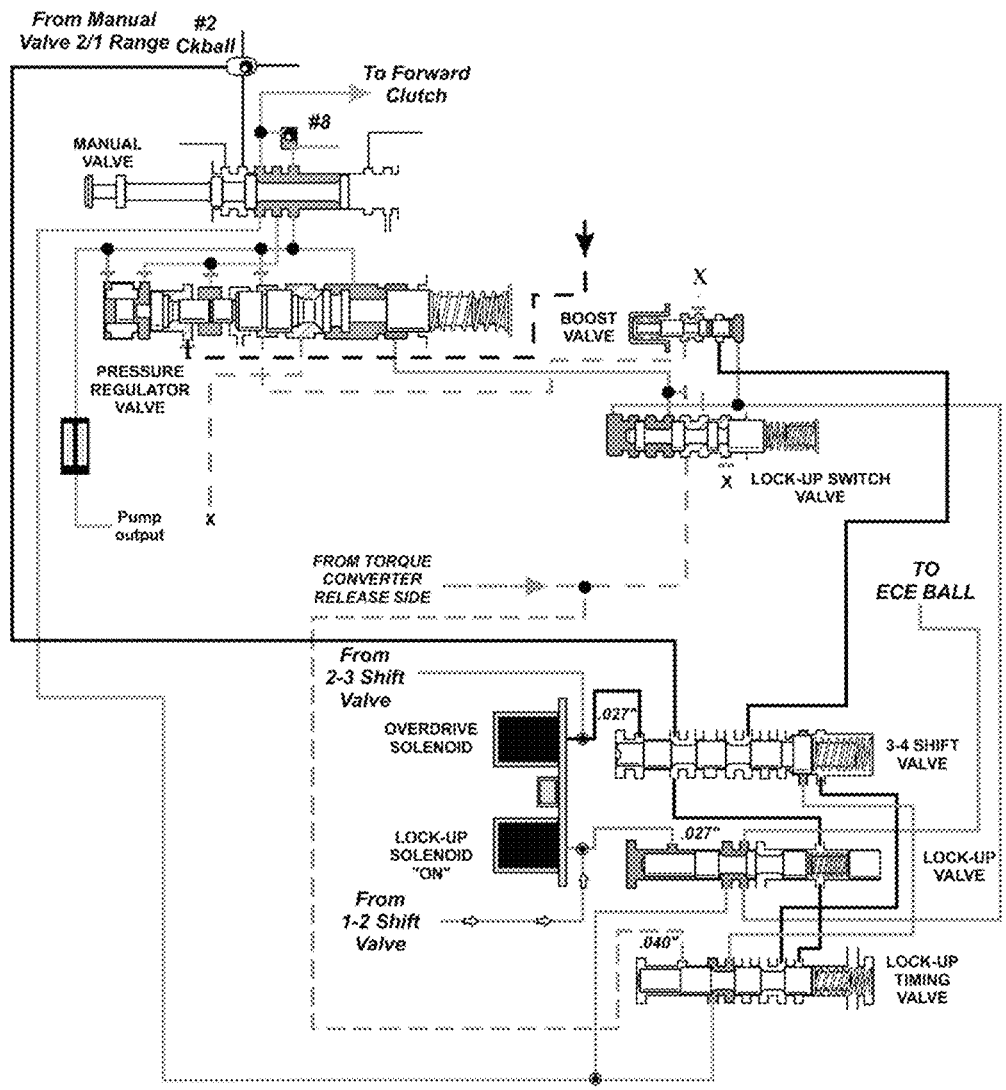
FIG. 15 is a hydraulic circuit diagram of the torque converter lock-up solenoid circuit in the 46RE and 47RE transmissions.

FIG. 15 shows a partial hydraulic schematic of the lock-up solenoid feed circuit in the 46RE and 47RE transmissions. The forward clutch feed circuit is connected to the lock-up solenoid from the 1-2 shift valve through an orifice. The 1-2 shift valve controls the forward clutch connection to the torque converter lock-up solenoid limiting torque converter lock-up clutch application to third and fourth gears. Additionally, the torque converter lock-up valve is inhibited by a passage from the #2 check ball when first gear is selected manually.

Figure 16:
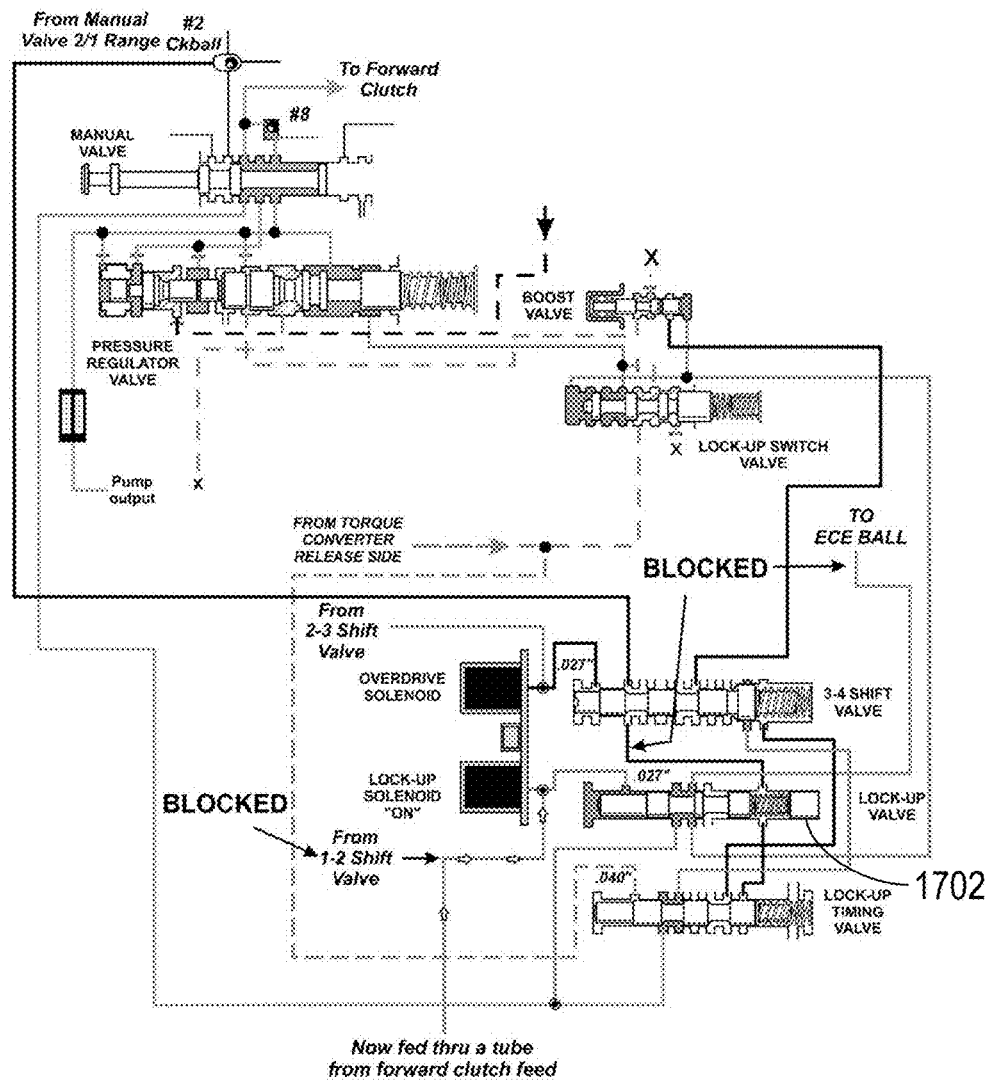
FIG. 16 is a hydraulic circuit diagram of the torque converter lock-up solenoid circuit in a modified 46RE or 47RE transmission.
Figure 17:
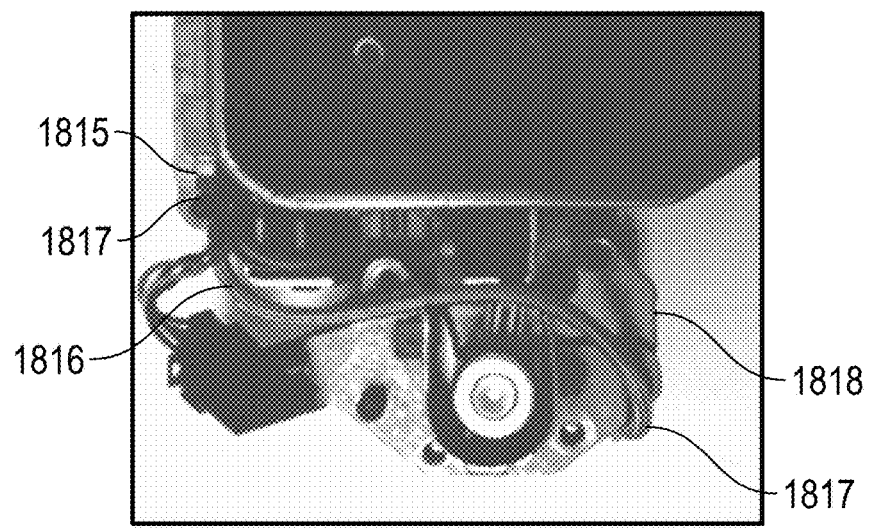
FIG. 17 is a top view of a governor solenoid casting connected via an external passageway to a solenoid manifold plate.
Figure 18:
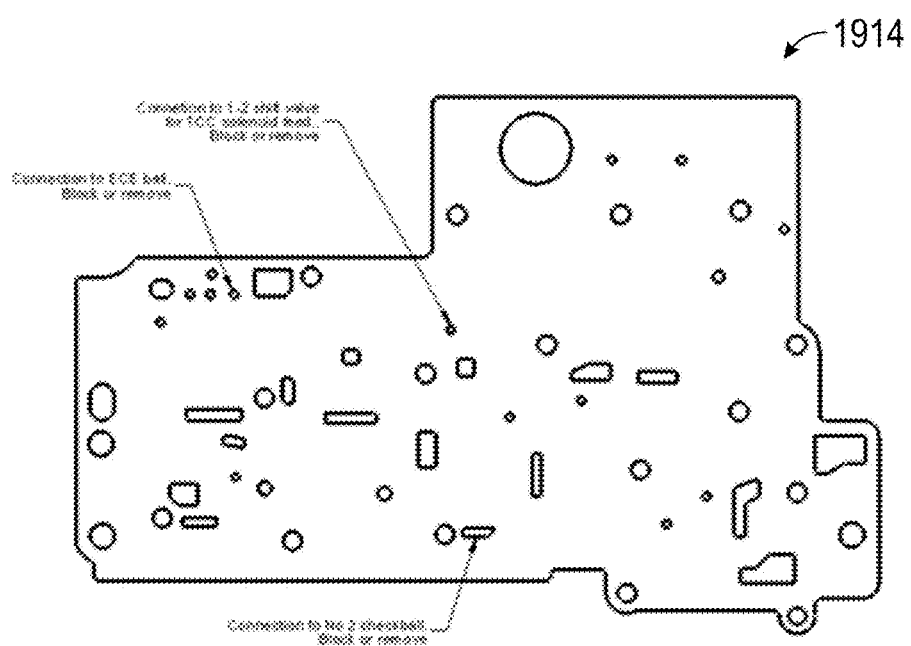
FIG. 18 is a top view of a modified overdrive separator plate.

FIG. 16 shows a partial hydraulic schematic of the torque converter lock-up solenoid circuit of a modified 46RE or 47RE transmission valve body that allows TCC lock-up in any gear. The illustrated embodiment allows torque converter clutch application in first and second gear and manual first by eliminating passages (e.g., three locations labeled "BLOCKED" in FIG. 16) to the torque converter clutch valve 1702 from the #2 check ball and the 1-2 shift valve on a new or modified overdrive separator plate 1914 (FIG. 18). The torque converter lock-up clutch solenoid is fed forward clutch pressure from a passage drilled through the governor solenoid casting 1818 (FIGS. 17, 21, 22) connected via an external passageway 1816 (FIG. 17) to a solenoid manifold plate 1815 (FIGS. 17, 19, 20) incorporating an orifice and positioned between the lower valve body and torque converter lock-up clutch solenoid/overdrive solenoid assembly.

In one example, a conversion of a 46RE or 47RE valve body to achieve torque converter clutch lock-up in manual first gear may include replacement of several original valve body components, with parts described below, and multiple modifications to the governor solenoid casting 1818. For example, orifices or openings in a 46RE or 47RE separator plate 1914 (FIG. 18) may be blocked with plugs, for example, of a malleable material, that in the illustrated embodiment, are swaged in-place in order to eliminate passageways in the plate. In another embodiment, a new overdrive separator plate that has been manufactured without the particular orifices that require elimination to block fluid flow may be utilized. In either case, to achieve the effect desired, three passageways in the 46RE and 47RE overdrive separator plate 1914 must be blocked or eliminated as shown in FIGS. 16 and 18. Blocking the passageway that transports pressurized fluid between the #2 check ball and the lock-up valve (FIG. 16) removes the valve body's ability to inhibit activation of the torque converter lock-up clutch. Blocking the passageway originally intended to feed the lock-up solenoid from the 1-2 shift valve eliminates that source of pressurized fluid. An additional kit component can be added to redirect forward clutch fluid to feed the lock-up solenoid as it is done in a 48RE transmission. Blocking a third orifice in the overdrive separator plate eliminates a secondary function of the 46RE and 47RE lock-up valve removing third gear application when the lock-up valve strokes.

The original lock-up solenoid pressurized fluid source in a 46RE and 47RE is the forward clutch circuit directed through the 1-2 shift valve. Blocking the separator plate 1914 passage eliminates that source. The forward clutch circuit may be connected as the feed source without including the 1-2 shift valve by delivering pressurized forward clutch fluid to the torque converter lock-up clutch solenoid. In one example, this is accomplished by positioning a solenoid manifold plate 1815 (FIGS. 17, 19, 20) between the lower valve body and the lock-up and overdrive solenoid assembly. The example solenoid manifold plate 1815 may be internally plumbed with an orifice, similar to the orifice in the 48RE lock-up solenoid feed circuit, to deliver fluid sourced from the forward clutch circuit. In one example, a conversion kit may include additional gaskets and longer fasteners to accomplish the installation of the solenoid manifold plate 1815.

The 48RE valve body delivers forward clutch fluid to the lock-up solenoid via internal cast passages of the valve body. To achieve a similar connection in a converted 46RE or 47RE valve body, in one embodiment, a conversion kit includes an external passageway 1816 (FIG. 17), of either rigid or flexible tube or pipe connected at each end, either to hydraulic fittings 1817 or some other method for connecting the external passageway 1816. One hydraulic fitting 1817 mounts to a drilled and tapped hole at a boss on the solenoid manifold plate 1815. Another hydraulic fitting 1817 is threaded into a drilled and tapped hole that intersects the forward clutch fluid passageway inside the governor solenoid casting 1818. Such a tube or pipe could be permanently formed, or if flexible restrained, to a position preventing any contact with proximal, rotating or translating transmission components.

Figure 22:
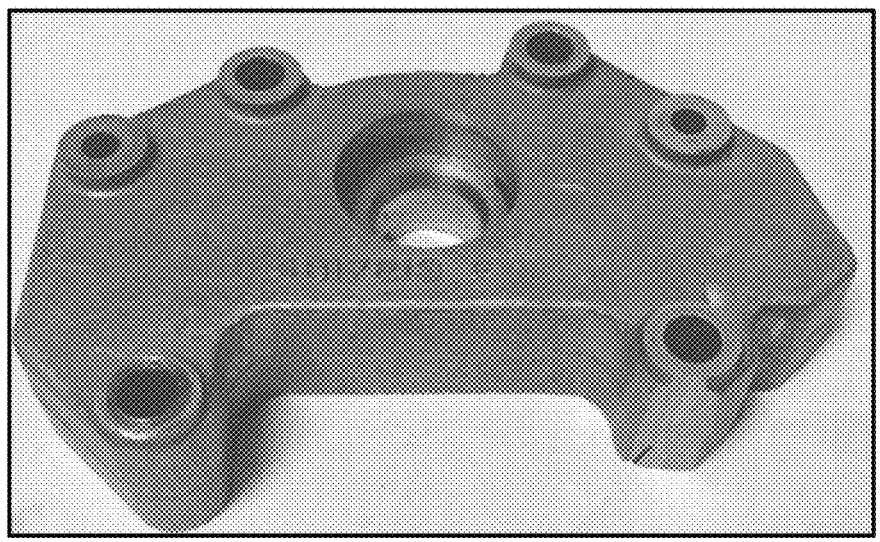
FIG. 22 is another view of the modified governor solenoid casting of FIG. 21.

Two modifications to the governor solenoid casting 1818 may be implemented to convert a 46RE or 47RE valve body to enable TCC lock-up in any gear. One modification, mentioned previously, is a passageway drilled to intersect the forward clutch fluid and tapped to accept a hydraulic fitting 1817 for connection of the external passageway 1816. The second modification is necessary to create additional clearance between components for assembly of the valve body. Installing the solenoid manifold plate 1815 between the lock-up and overdrive solenoids assembly and the lower valve body necessarily moves the lock-up and overdrive solenoids assembly the thickness of the solenoid manifold plate 1815, plus the thickness of an additional gasket, away from the lower valve body casting. This dislocation will cause interference between the lock-up and overdrive solenoids assembly and the governor solenoid casting 1818 unless the governor solenoid casting 1818 is modified to allow additional clearance. FIG. 21 shows the location of a drilled and tapped hole on a face of the governor solenoid casting 1818 intended for connecting the external passageway 1816 hydraulic fitting 1817 to the forward clutch circuit. FIG. 22 shows a flattened bolt boss on the governor solenoid casting 1818. The bolt boss has been flattened to create space between the lock-up/overdrive solenoid assembly and the governor solenoid valve body casting 1818.

In one example, a kit for modifying a 46RE or 47RE valve body to perform like a 48RE valve body may include the following components for modifying a PRV to have a 48RE line pressure response in fourth gear and when TCC is engaged:
 1-BENT STEEL TUBE (e.g., external fluid passageway 106);
 2-SCREW SET #6-32×⅛" for attaching a replacement PRV endplate to a lower valve body;
 1-PLATE, Replacement PRV end plate (e.g., replacement PRV end plate 112, FIG. 1);
 1-BOOST VALVE MANIFOLD; and
 1-PLATE, LOWER SEPARATOR PLATE (for replacing, e.g., OE separator plate 500, FIG. 5).

The kit may also include the following components for allowing the TCC to engage in any forward gear:
 1-TCC/OD MANIFOLD (e.g., Solenoid manifold plate 1815, FIG. 17);
 3-LGSCREW, HSH CAP #10-24×¾"LG (for TCC Lockup manifold longer bolts);
 2-CRIMP CLAMP, SINGLE-EAR TUBE (to attach an external fluid passageway to hydraulic fittings);
 1-GASKET, TCC/OD SOLENOID;
 1-PTFE, TUBE ⅛" ID×8¾" L (external fluid passageway);
 1-FITTING, BARBED ELBOW (e.g., hydraulic fitting 1817 (FIG. 17));
 1-PTFE, TUBE ⅛" ID×5½" L FITTING, (external fluid passageway); and
 1-BARBED STRAIGHT FITTING hydraulic fitting.

The kit may also include the following components to ensure proper operation of a valve body:
 1-SPRING, THROTTLE VALVE;
 1-SPRING, PR VALVE SPRING;
 1-LIMIT VALVE SPRING;
 1-TCC TIMING VALVE SPRING; and
 1-SPRING, THROTTLE LINE PRESSURE.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of modifying a transmission valve body, the valve body including:
 an external surface;
 a pressure regulator valve (PRV) having a plurality of cutback ports, wherein, during use, pressurized fluid in the plurality of cutback ports urges the PRV towards a reduced line pressure position, a first one of the cutback ports being in fluid communication with an exhaust passage; and
 a second valve for selectively placing the exhaust passage in fluid communication with a transmission fluid exhaust reservoir;
 the method comprising:
  providing an external fluid passageway having a first end and a second end;
  placing the first end of the external fluid passageway in fluid communication with a second one of the cutback ports; and placing the second end of the external fluid passageway in fluid communication with the exhaust passage so that, when the valve body is in use, the second one of the cutback ports is exhausted to the exhaust reservoir when the second valve places the exhaust passage in fluid communication with the exhaust reservoir.

2. A method according to claim 1, wherein the valve body includes a PRV endplate, the method further comprising:
replacing the PRV endplate with a replacement PRV endplate, the replacement PRV endplate having a fluid port;
wherein the placing the first end of the external fluid passageway step includes coupling the first end of the external fluid passageway to the replacement PRV endplate fluid port.

3. A method according to claim 1, further comprising:
providing an external valve in fluid communication with the external fluid passageway, the external valve for selectively placing the external fluid passageway in fluid communication with the transmission fluid exhaust reservoir; and
configuring the external valve to be controlled by a position of the second valve.

4. A method according to claim 3, wherein the second valve is an original equipment (OE) boost valve located in the valve body.

5. A method according to claim 1, wherein the placing the second end of the external fluid passageway step includes:
forming an opening in the valve body, the opening extending from the external surface of the valve body to the exhaust passage; and
coupling the second end of the external fluid passageway to the opening.

6. A method according to claim 1, wherein the second valve is a boost valve having a bore and a cover plate, further wherein the placing the second end of the external fluid passageway step includes:
removing the boost valve cover plate;
forming an opening in the valve body extending from the external surface of the valve body to the boost valve bore;
installing a replacement boost valve cover plate, the replacement boost valve cover plate having an internal fluid passageway; and
coupling the second end of the external fluid passageway to the replacement boost valve cover plate internal fluid passageway.

7. A method according to claim 1, wherein the valve body includes a separator plate having a first orifice upstream of the first cutback port and a second orifice upstream of the second cutback port, the method further including:
eliminating one of the orifices.

8. A method according to claim 7, wherein the eliminating step includes blocking at least one of the first and second orifices.

9. A method according to claim 7, wherein the eliminating step includes replacing the separator plate with a replacement separator plate that does not have at least one of the first and second orifices.

10. A kit for modifying a transmission valve body, the valve body including a valve body casting having an external surface, a pressure regulator valve (PRV) bore, a plurality of cutback ports extending from the PRV bore, a boost valve bore, and an exhaust passage configured to provide fluid communication between at least one of the cutback ports and the boost valve bore, the boost valve bore for housing a boost valve configured to selectively place the exhaust passage in fluid communication with a transmission fluid exhaust reservoir, the kit comprising:
a fluid conduit having first and second ends, the fluid conduit being sized and configured for the first end of the fluid conduit to be coupled to the valve body casting so as to be in fluid communication with a second one of the cutback ports, the fluid conduit being sized and configured for the second end of the fluid conduit to be coupled to the valve body casting to be in fluid communication with the boost valve bore so that, during use, the second cutback port is placed in fluid communication with the exhaust reservoir when the boost valve places the exhaust passage in fluid communication with the exhaust reservoir.

11. A kit according to claim 10, wherein the valve body further includes a PRV endplate coupled to the valve body casting for sealing an end of the PRV bore, the kit further comprising a replacement PRV endplate for replacing the PRV endplate, the replacement PRV endplate having a fluid port for coupling the first end of the fluid conduit to the valve body casting.

12. A kit according to claim 10, wherein the valve body further includes a separator plate having a first orifice upstream of the at least one cutback port and a second orifice upstream of the second cutback port, the kit further comprising at least one plug sized and configured to block at least one of the first and second orifices.

13. A kit according to claim 10, wherein the valve body further includes a separator plate having a first orifice upstream of the at least one cutback port and a second orifice upstream of the second cutback port, the kit further comprising a replacement separator plate for replacing the separator plate that does not have at least one of the first and second orifices.

14. A kit according to claim 10, wherein the valve body further includes a boost valve cover plate coupled to the valve body casting for sealing the boost valve bore, the kit further comprising a replacement boost valve cover plate having a fluid port for coupling the second end of the fluid conduit to the valve body casting for placing the fluid conduit in fluid communication with the boost valve bore.

15. A kit according to claim 10, wherein the valve body casting includes a first end and a second end and a bottom surface extending therebetween, the PRV bore extending substantially parallel to the bottom surface and having a first end proximate the valve body casting first end, the valve body casting further including a boost valve portion having a first outer wall that is substantially parallel to the PRV bore and substantially perpendicular to the bottom surface, wherein the fluid conduit is sized and configured for the first end of the fluid conduit to be coupled to a fluid port formed in the PRV bore and for the second end to be coupled to a fluid port in the boost valve portion first outer wall.

16. A valve body, comprising:
a valve body casting having an external surface;
a pressure regulator valve (PRV) disposed in a PRV bore formed in the valve body casting;
a plurality of cutback ports extending from the PRV bore;
a second valve disposed in the valve body casting and configured to be in fluid communication with a transmission fluid exhaust reservoir;
an exhaust passage in the valve body casting for providing fluid communication between a first one of the cutback ports and the second valve; and an external fluid conduit disposed outside of the valve body casting for providing fluid communication between a second one of the cutback ports and the exhaust passage;

wherein the second valve is configured to selectively place the exhaust passage in fluid communication with the transmission fluid exhaust reservoir to thereby reduce a fluid pressure in the first and second cutback ports and cause the PRV to increase a transmission line pressure.

17. A valve body according to claim 16, wherein the second valve is configured to place the exhaust passage in fluid communication with the transmission fluid exhaust reservoir in at least one of a fourth gear configuration and a torque converter clutch lockup configuration.

18. A valve body according to claim 16, further comprising a PRV endplate having a fluid port and being coupled to the valve body casting for sealing an end of the PRV bore, wherein the external fluid conduit includes a first end and a second end, the first end being coupled to the PRV endplate fluid port.

19. A valve body according to claim 16, further comprising an opening extending from the external surface of the valve body casting to the exhaust passage, wherein the external fluid conduit is coupled to the opening.

20. A valve body according to claim 16, wherein the second valve is a boost valve, the valve body further comprising a boost valve cover plate having a fluid port and being coupled to the valve body casting for sealing the boost valve, wherein the external fluid conduit is coupled to the boost valve cover plate fluid port.

21. A valve body according to claim 16, wherein the valve body further includes a separator plate having a first orifice upstream of the first cutback port and a second orifice upstream of the second cutback port, the valve body further including a plug disposed in at least one of the first and second orifices for blocking the first or second orifice.

* * * * *

UNITED STATES PATENT AND TRADEMARK OFFICE
CERTIFICATE OF CORRECTION

PATENT NO. : 10,060,526 B2
APPLICATION NO. : 15/054211
DATED : August 28, 2018
INVENTOR(S) : Dial et al.

It is certified that error appears in the above-identified patent and that said Letters Patent is hereby corrected as shown below:

In the Specification

Column 1, Lines 36-37, delete "torque converter lock-up clutch (TCC)." and insert -- torque converter clutch (TCC). --, therefor.

Signed and Sealed this
Fifth Day of March, 2019

Andrei Iancu
*Director of the United States Patent and Trademark Office*